(12) United States Patent
Kitada et al.

(10) Patent No.: US 7,988,050 B2
(45) Date of Patent: Aug. 2, 2011

(54) SYSTEM, METHOD AND APPARATUS FOR PROCESSING AN EMBEDDED BARCODE

(75) Inventors: Hiroshi Kitada, Tuckahoe, NY (US); Lana Wong, Randolph, NJ (US)

(73) Assignees: Ricoh Company, Ltd., Tokyo (JP); Ricoh Americas Corporation, West Caldwell, NJ (US)

( * ) Notice: Subject to any disclaimer, the term of this patent is extended or adjusted under 35 U.S.C. 154(b) by 304 days.

(21) Appl. No.: 12/251,480

(22) Filed: Oct. 15, 2008

(65) Prior Publication Data

US 2010/0089992 A1     Apr. 15, 2010

(51) Int. Cl.
*G06K 7/10* (2006.01)

(52) U.S. Cl. .................... 235/462.01; 235/375

(58) Field of Classification Search ............. 235/462.01, 235/462.08, 462.09, 462.1, 375
See application file for complete search history.

(56) References Cited

U.S. PATENT DOCUMENTS

| | | | |
|---|---|---|---|
| 6,398,117 B1 * | 6/2002 | Oakeson et al. | 235/494 |
| 6,772,947 B2 | 8/2004 | Shaw | |
| 6,873,435 B1 * | 3/2005 | Tehranchi et al. | 358/1.9 |
| 2001/0029513 A1 * | 10/2001 | Kuwano et al. | 707/522 |
| 2005/0068581 A1 * | 3/2005 | Hull et al. | 358/1.16 |
| 2007/0204164 A1 * | 8/2007 | Cattrone et al. | 713/176 |
| 2008/0018731 A1 * | 1/2008 | Era | 348/51 |
| 2008/0104408 A1 * | 5/2008 | Mayer | 713/178 |

OTHER PUBLICATIONS

U.S. Appl. No. 12/251,478, filed Oct. 15, 2008, Kitada, et al.

* cited by examiner

*Primary Examiner* — Edwyn Labaze
(74) *Attorney, Agent, or Firm* — Oblon, Spivak, McClelland, Maier & Neustadt, L.L.P.

(57) ABSTRACT

A document management system including an information processing apparatus having an interface to receive an input selecting one of a plurality of image processing services. The information processing apparatus also generates machine-readable instructions based on the selected image processing services and generates a barcode corresponding to the machine-readable instructions, which is included on a document. An image processing apparatus then scans the document including the barcode and extracts the machine-readable instructions from the barcode. Based on the extracted instructions, the image processing apparatus initiates a process.

17 Claims, 15 Drawing Sheets

SYSTEM, METHOD AND APPARATUS FOR PROCESSING AN EMBEDDED BARCODE

BACKGROUND OF THE INVENTION

1. Field of the Invention

The present invention is directed to system, method, and apparatus for embedding and processing barcodes.

2. Discussion of the Background

Over the past several years, there has been an increase in the number and types of document-related applications available over networks. These applications may include document management systems, such as those specializing in managing documents of various specific contents, for example medical, legal, financial, marketing, scientific, educational, etc. Other applications include various delivery systems, such as e-mail servers, facsimile servers, and/or regular mail delivery. Yet other applications include document processing systems, such as format conversion and optical character recognition systems. Further applications include document management systems used to store, organize, and manage various documents. Such applications will be referred to hereinafter as "projects" and are generally located at a server.

Various systems for accessing these network applications from image processing devices (e.g., scanners, printers, copy machines, cameras) have been contemplated. One system associates a computer with each image processing device for managing the documents with the network applications. The computers communicate with the various network applications to enable the use of the applications by the user of the image processing devices. For example, the computers request and receive from the network applications information about the format and content of the data required by the applications to manage the documents. The computers process this information and configure the image processing devices to provide the correct format and content.

These systems also may authenticate a user at an image processing device using single-factor network user authentication. Single-factor user authentication typically involves entering only a username and password which are stored at the image processing device or transmitted to a network server. The image processing device or the server then compares the submitted information to stored username and passwords corresponding to users that are authorized to access the system. Since all of the information needed to gain access to the network is actually stored at the image processing device or on the network, single-factor authentication does not provide strong security against an unauthorized user. An authorized user's username or user ID is typically known, and therefore only the password needs to be compromised in order for an unauthorized user to gain access to the network. Also, storing password data on corporate networks introduces additional vulnerability to attackers who gain network access or may also facilitate insider fraud.

Further, when scanning a document, there is a desire to associate that particular document with a specific workflow, which would include the processing of the particular document itself. The processing may include image processing, the saving of the information contained within the particular document, the delivery destination of the document, or the security level of the scanned document, just to name a few. The above is conventionally accomplished via communications made from a multi-function device ("MFD") and a server that processes the scanned document. Having information go back and forth from an MFD and a server can take up processing time and risk security, as mentioned above.

Therefore, there is a desire to eliminate the need of a server system or external system that is used in a conventional implementation. Including all of the processing power and capability in an MFD would eliminate the need of an external server, and the communication therebetween. The elimination of the network communication between the MFD and the server would save up on the time needed to process the document, save on user intervention, and would achieve higher levels of security.

Presently, the use of barcodes is common in dedicated/production environments, but not as much in a common office setting. One of the reasons is for security concerns. For example, if an unauthorized person obtains a barcode document including the user's credentials, with a destination folder pointing to the user's folder, this causes a concern from a security standpoint. The present disclosure includes a barcode-type system that is both easy to use and secure in a standard office environment as well as a production environment The present disclosure relates to the field of embedding data into a barcode for processing purposes. U.S. Pat. No. 6,772,947, the entire content of which is hereby incorporated by reference, discusses the different type of barcode scanning available, namely one dimensional and two dimensional scanning. A one dimensional barcode scanning involves scanning wide and narrow bar patterns, looking up "code" in a database, or the like, and then using the results in an application. Two dimensional barcode scanning involves scanning square or rectangular patterns that encode data in two dimensions. FIG. 2 shows an example of a typical two dimensional barcode. Each barcode feature requires a data type to define its extent and also a set of feature descriptors called attributes. Attributes might be of nearly any data type such as text, numeric, or binary. The attributes provide the basis for interpreting the features.

Barcode processing is a resource intensive operation in terms of memory, CPU, and the like. First, the processor needs to load the image containing the barcode. Next, the image is examined section by section to identify the barcode, and then the barcode format is compared to a barcode dictionary to validate that it is a valid barcode image. Then, the barcode information is extracted based on predetermined characters, decrypted by 128-bit algorithms (a resource intensive operation within itself), and finally the actual constructed data is processed.

SUMMARY OF THE INVENTION

The present inventors have determined that is more efficient to encode machine-readable instructions directly into the barcode in order to simplify the processing between an MFD and a project connected to the MFD.

The document management system of the present invention includes an information processing apparatus having an interface to receive an input selecting one of a plurality of image processing services. The information processing apparatus also generates machine-readable instructions based on the selected image processing services and generates a barcode corresponding to the machine-readable instructions, which is included on a document. An image processing device then scans the document including the barcode and extracts the machine-readable instructions from the barcode. Based on the extracted instructions, the image processing device initiates a process.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
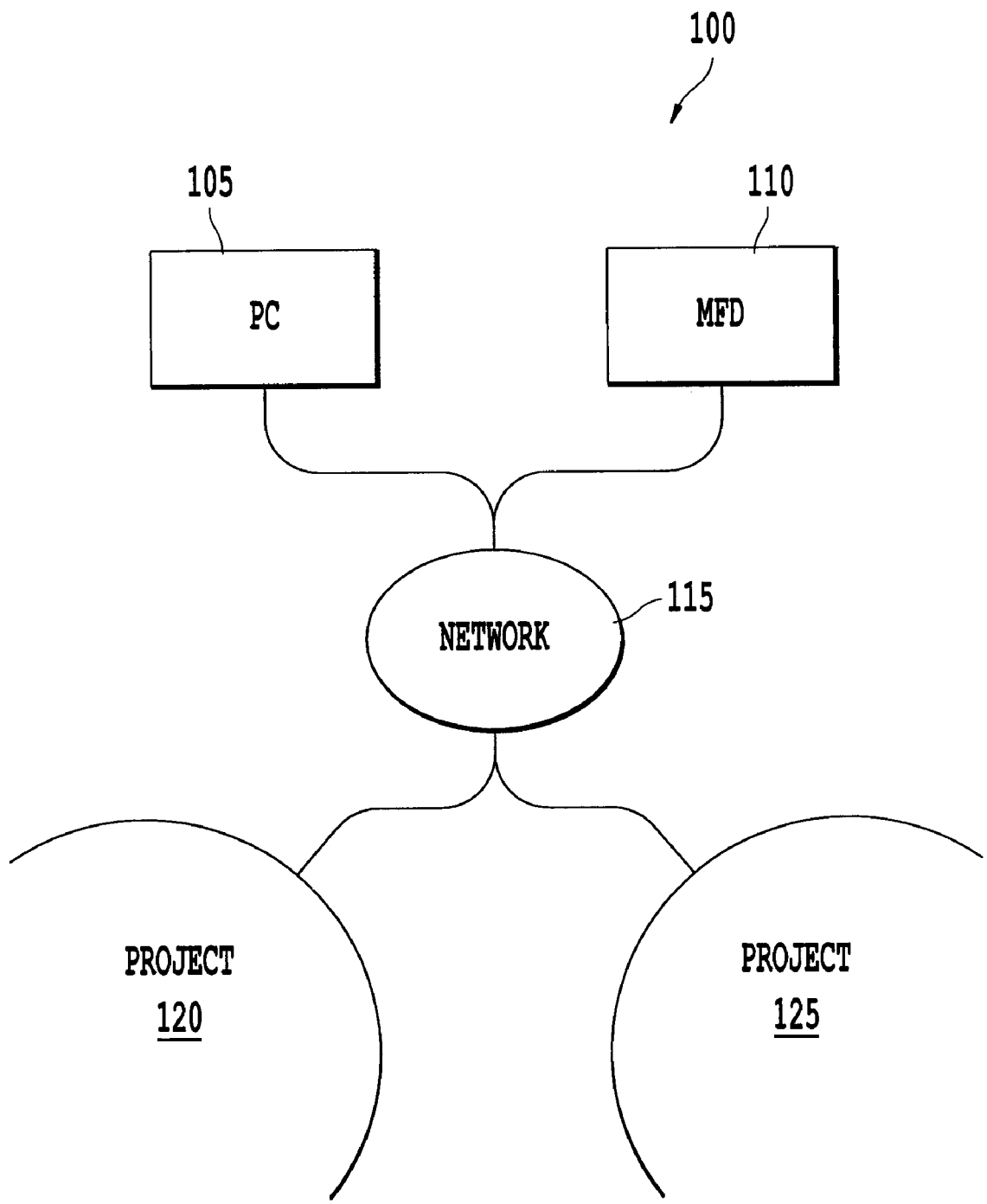
FIG. 1 is a block diagram showing an overall system configuration.
Figure 2:
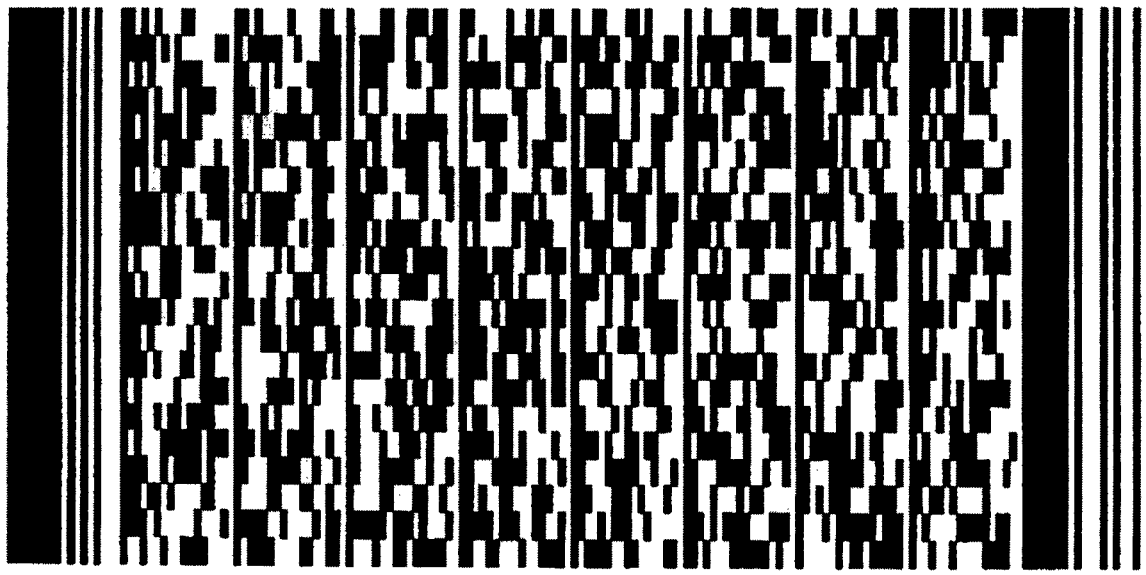
FIG. 2 is an example of a typical two dimensional barcode.

Referring now to the drawings, wherein like reference numerals designate identical or corresponding parts throughout the several views, FIG. 1 is a diagram of a system 100 for managing documents, files, or other types of tangible mediums, by processing information related to barcodes. The present disclosure preferably uses a barcode system developed by ExperVision, although any barcode generated by any type of conventional process may be used. The system 100 includes a network 115 that interconnects at least one image processing device 110, a personal computer (PC) 105, and at least one project, such as project 120 and/or project 121. The network 115 preferably uses TCP/IP (Transmission Control Protocol/Internet Protocol), but any other desirable network protocol such as, for example IPX/SPX (Internetwork Packet Exchange/Sequential Packet Exchange), NetBEUI (NetBIOS Extended User Interface), or NetBIOS (Network Basic Input/Output System) is possible. The network 115 can be a local area network, a wide area network, any type of network such as an intranet, an extranet, the Internet or a combination thereof. Other communications links for the network 115, such as a virtual private network, or a wireless link, may be used as well.

As shown in FIG. 1, the device 110 can be at least one multi-function device, or "MFD." An MFD may incorporate or be any one of a plurality of a scanner, a copy machine, a printer, a fax machine, a digital camera, other office devices, and combinations thereof. Any one or combinations of these devices are referred to as an MFD, generally. Various types of MFDs are commonly known in the art and share common features and hardware with the MFDs of the present invention. In one embodiment of the present invention, the MFD is a portable device, such as a digital camera, connectable to the Internet via a wired or wireless connection. Such an MFD combines digital imaging and internet capabilities so that one can capture still images, sounds or videos and share such multimedia using wired or wireless connections from various locations. The MFD can create web pages, send and receive e-mails with attachments, edit images, FTP files, surf the Internet, and send or receive a fax. In another embodiment, the MFD can be a multiple scanner, photocopier and printer.

Next, with reference to FIG. 3, a process for embedding a barcode into a document at a user PC 105 will be described. However, it is noted that this similar process of embedding a barcode may be performed at an MFD, or at any other device capable of performing image processing.

Figure 3:
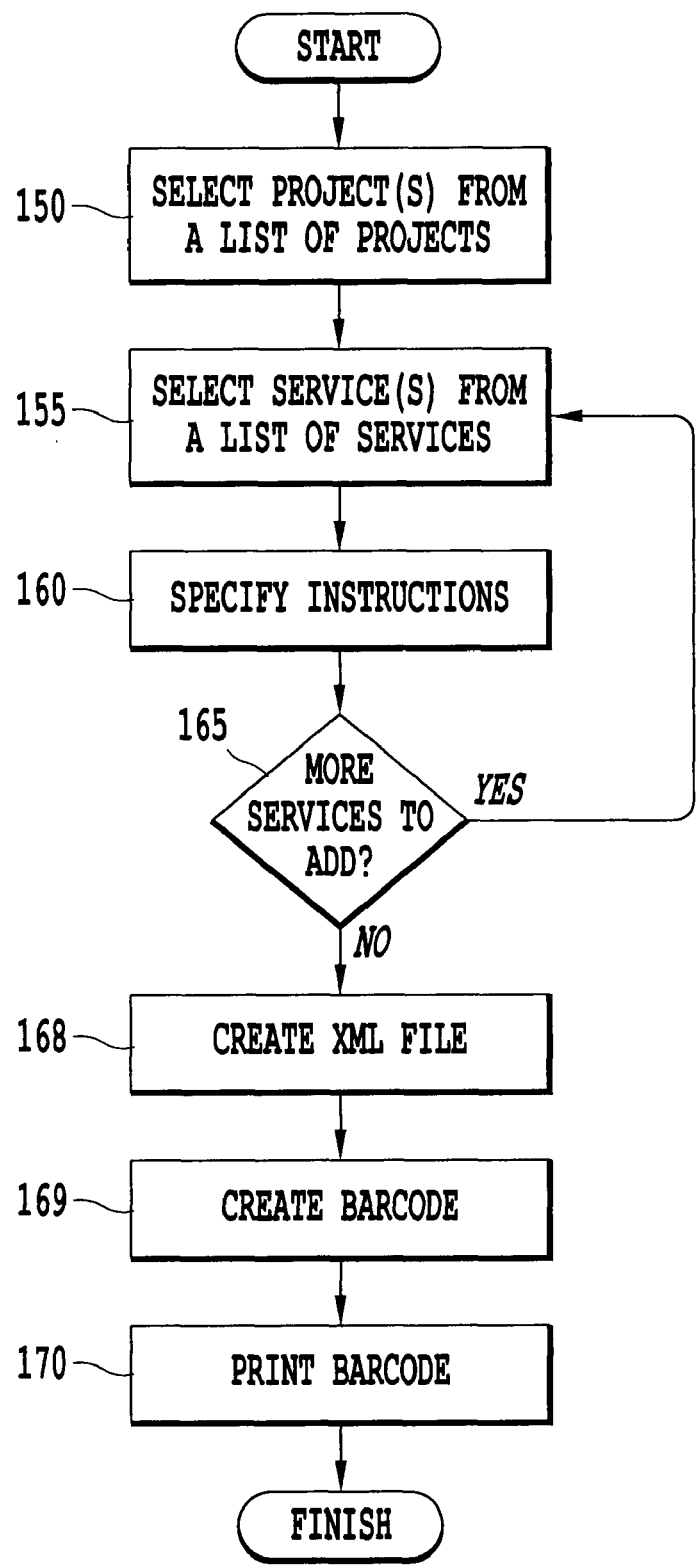
FIG. 3 is a block diagram detailing the flow of generating a barcode according to an embodiment.

With regards to FIG. 3, at the PC 105 terminal, a user may select one or more project(s), at step 150. The projects may appear on the screen of the PC 105 in the form of a computer application containing a list from which the user can select. Next, at step 155, the user may select a service from a list of services, which may also appear through an application on the screen of the PC 105. For example, a Human Resources "HR" project may include services "Email" and "Folder." The "Email" service executes and sends a document through e-mail to the designated destination, given by the e-mail address. The document and destination are identified by the user in the Extensible Markup Language, or "XML," format, although other formats, such as Hyper Text Markup Language, or "HTML," can equivalently be used. "Folder" executes to store the document in a specified folder and as a specific document type, wherein the document, folder, and document type are identified by the user in the XML format. Further, the project(s) and service(s) may be predefined in a database in the XML format.

Next, at step 160, the user specifies instructions by inputting parameters for each selected service. At step 165 the user can decide whether or not to add more services, and if so, he or she will be prompted to select a service from the list of services 155, followed by specifying any instructions 160. If the user chooses not to add any more services, the system creates an XML data file, at step 168, in which the selected project(s) including the selected service(s) with the input parameters are described. The XML data file is then coded as a barcode, at step 169, and then printed, at step 170, by any conventional printing method. The barcode can be physically printed on a document, file, or any other tangible medium, or it can be printed digitally on any digital document or file. Printing at step 170 can be performed by a wired or wireless printer communicating directly with the PC 105, by a printer accessed through the network 115, or any other conventional barcode-printing means.

Figure 4:
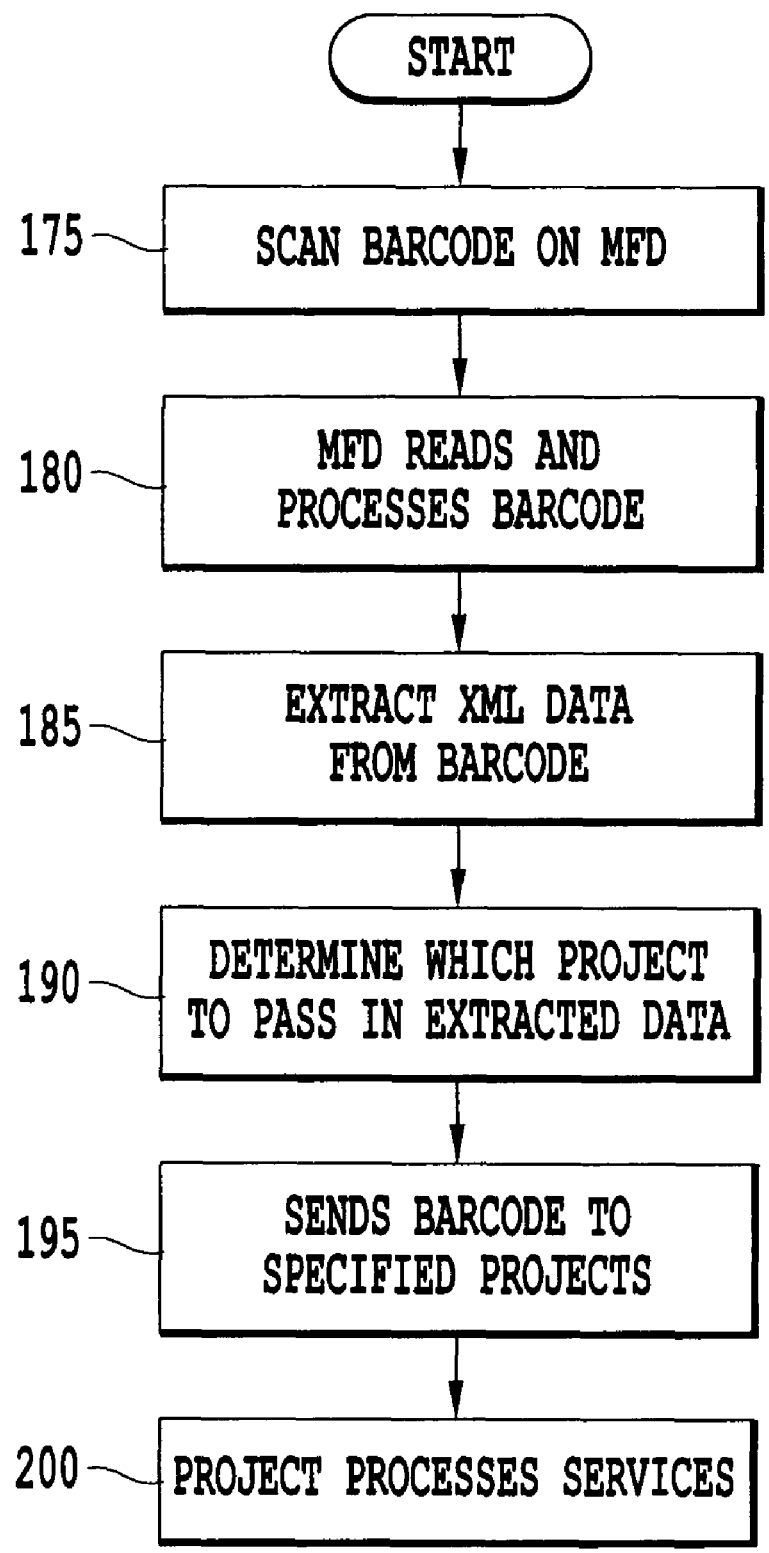
FIG. 4 is a block diagram detailing the process flow of a barcode according to an embodiment.

The document or file can be sent through network 115 and on to at least one MFD. A document printed by the PC 105 may also be physically placed on the MFD for a scanning operation. FIG. 4 is a block diagram detailing the process flow of the barcode. At step 175, the barcode is scanned by any conventional scanning method. Next, at 180, an MFD barcode service engine reads and processes the barcode, and extracts the XML data, at step 185, from the processed barcode. The output is, for example, a barcode.xml file, such as:

```
<barcode>
    <HR> - this tag is generated by AdminTool from
<project><name>HR</name></project> in project.xml
        <service_list>
            <DMEmail> - this tag is created by AdminTool from
<service><name>DMEmail</name></service> in project.xml
                <e-mail>user1@ricoh-usa.com</e-mail>
                <document_name>document1.doc</document_name>
            </DMEmail>
            <DMFolder> - this tag is created by AdminTool from
<service><name>DMEmail</name></service> in project.xml
                <DM_folder>/MyCabinet/resume/user1</DM_folder>
                <document_name>resume_user1.doc</document_name>
                <document_type>resume</document_type>
            </DMFolder>
        </service_list>
    </HR>
    <Accounting> - this tag is generated by AdminTool from
<project><name>Accounting</name></project> in project.xml
        <service_list>
            <Scan_to_Email> - this tag is created by AdminTool from
<service><name>Scan_to_Email</name></service> in project.xml
                <e-mail>user1@ricoh-usa.com</e-mail>
                <document_name>invoice1.doc</document_name>
            </Scan_to_Email>
            <Scan_to_Folder> - this tag is created by AdminTool from
<service><name>Scan_to_Folder</name></service> in project.xml
                <folder>/Accounting/invoice/</folder>
                <encryption>ON-256bit</encryption>
                <document_name>invoice1.doc</document_name>
            </Scan_to_Folder>
        </service_list>
    </Accounting>
</barcode>
```

Next, at step 190, based on the extracted data information, the MFD engine determines which project to pass the data, barcode, document, or any combination thereof, to. At step 195, the MFD engine passes, routes, or sends, the aforementioned data, barcode, document, or any combination thereof to a specified project, such as the "HR" project or the "Accounting" project. More specifically, from the above file, the "<project name>" tag is read, and the data is passed to the designated project, i.e. <HR> tag data is passed to the "HR" project. Such routing is conducted through the network 115 by any conventional routing method. At step 200, the appropriate project processes the information containing the services and the corresponding instructions.

Figure 5:
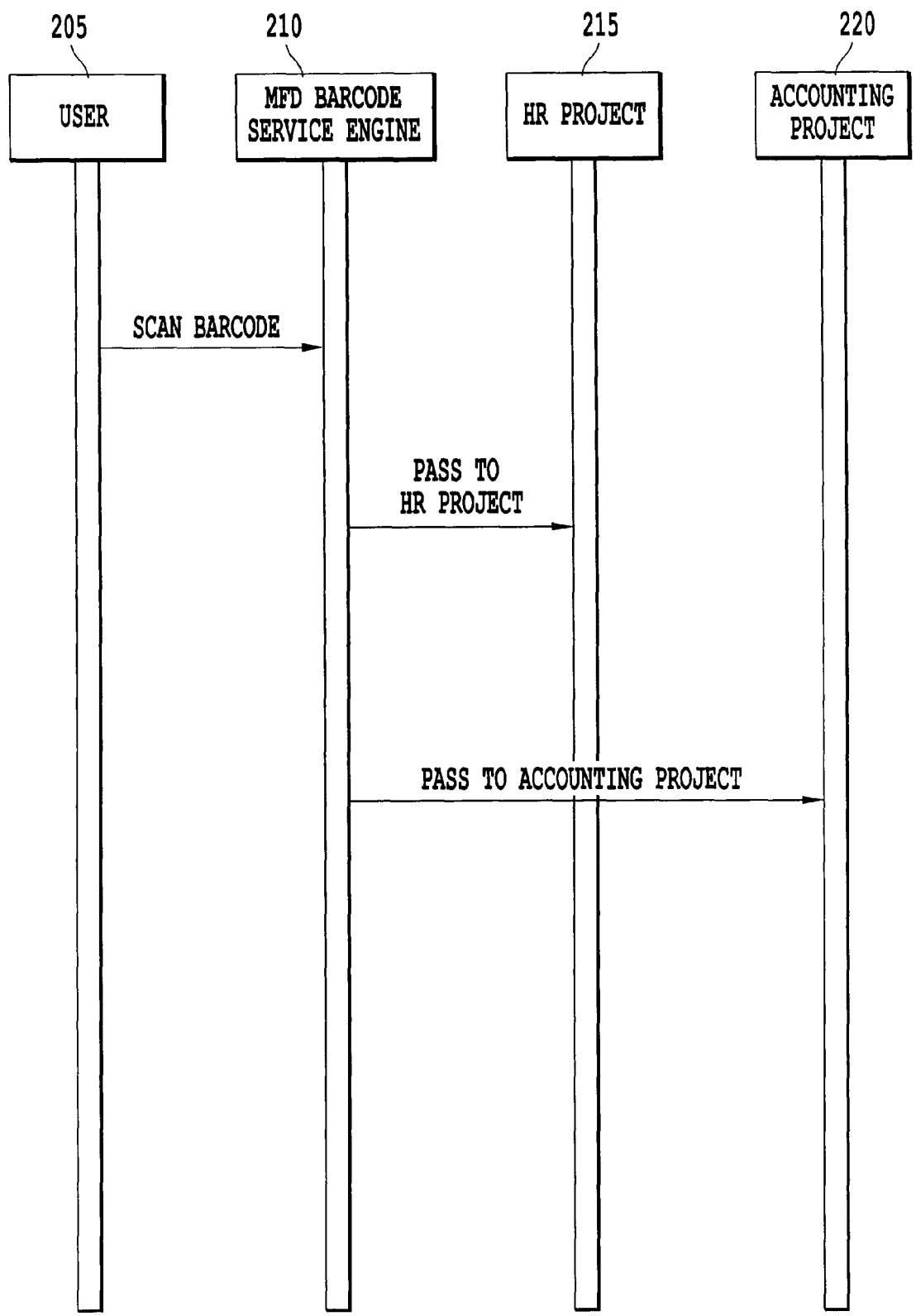
FIG. 5 shows an example of a barcode processing sequence according to an embodiment.

FIG. 5 shows an example of a barcode processing sequence showing the steps of the embodiment presented above. The example follows from the aforementioned barcode file. The user 205 starts by scanning the already-embedded barcode printed on a document or file on the MFD. The barcode service engine 210, located within the MFD, reads the scanned barcode and extracts the barcode.xml file. The engine then separates the embedded data according to project name. For example, the MFD engine may separate barcode_HR.xml and barcode_Accounting.xml, and then pass or route the .xml files to each corresponding project. In this case, barcode_HR.xml is routed to the HR project 215, and barcode_Accounting.xml is passed to the Accounting project 220.

At the HR project 215, an engine parses barcode_HR.xml. The HR project contains two services: DMEmail and DMFolder. In the HR project 215, an engine sends e-mail according to the specified instructions found within the .xml file, i.e. to user1@ricoh-usa.com, and sets the document name to document1.doc. Next, an engine stores to the DMFolder, /MyCabinet/resume/user1, sets document name to user1_resume.doc, and sets the document type as resume.

At the Accounting project 220, an engine parses barcode_Accounting.xml. The Accounting project contains two services: Scan_to_Email and Scan_to_Folder. In the Accounting project, an engine sends email according to the specified instructions found within the .xml file, i.e. to user1@ricoh-usa.com, and sets the document name to invoice1.doc. Next, an engine stores to the folder, /Accounting/invoice/, encrypts document invoice1.doc, and sets document name to invoice1.doc.

Figure 6:
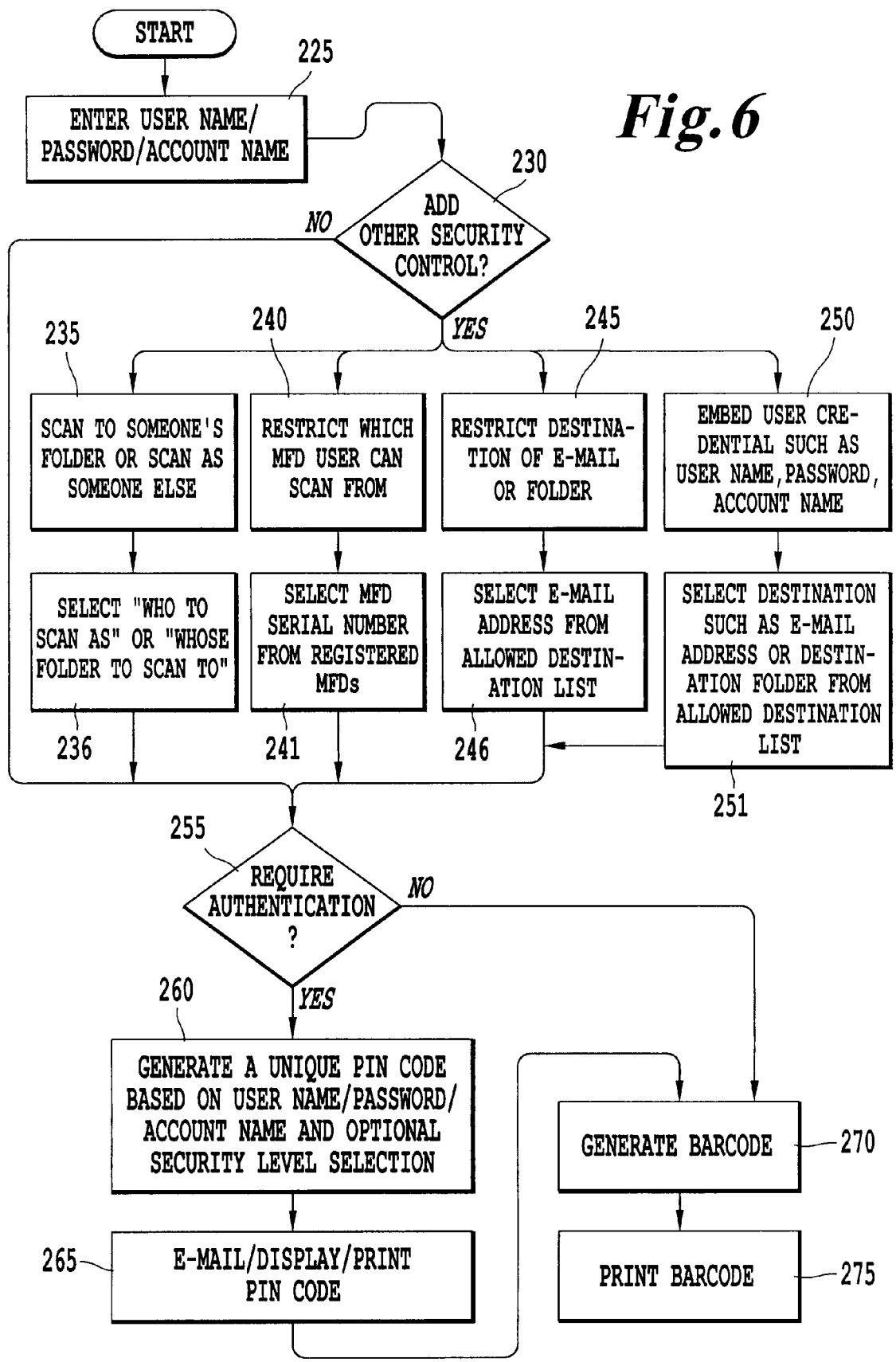
FIG. 6 is a block diagram showing the process of embedding security data in a barcode according to an embodiment.

FIG. 6 is a block diagram showing the process of embedding security data in a barcode according to an embodiment. At step 225, a user enters the user name, password, account name, or any combination thereof. The PC 105 or the system prompts the user, at step 230, to add other types of security data or security control. It should be noted that these security features may be added independently, or as one of the instructions specified in FIG. 3, for example. If the user so chooses, he or she may add as much security data as is needed or desired. Steps 235, 240, 245, and 250 are used to show a limited number of example security data that may be added by a user. It is to be understood that one of ordinary skill may add and/or expand on these security controls and/or use other types of security methods.

After the login step 225, a user can choose to scan to another user's folder or scan as another user 235, such as an assistant scanning for his or her manager, by selecting from a list "Who to Scan as" or "Whose folder to scan to" 236. Similarly, if the user wishes to add security restricting which MFD a user can scan from 240, he or she may select an MFD serial number, or a number of MFD serial numbers, from a list of registered MFDs 241. A user may also choose to restrict the destination of an e-mail or a folder 245 by selecting an e-mail address from a list of allowed destinations 246. Another option is to embed user credentials such as, but not limited to, user name, password, or account name 250, and select a destination, such as an e-mail address or a destination folder, from a list of allowed destinations 251.

Next, the user may add more security data to the barcode by requiring authentication 255, or if there is no need, may directly generate 270 and print 275 the barcode. If authentication is desired, such authentication 255 may include any number of factors, depending on the needs of the user. For a document of less importance, a one-factor authentication may suffice, whereas for a very important proprietary document, a two (or more) factor authentication may be used to provide extra security. A two-factor authentication may include the user's credentials when logging on the MFD, and the PIN code, or other authentication information such as biometrics, embedded in the barcode.

If the user requires authentication, then the system generates a unique PIN code based on, but not limited to, any of user name, password, or account name 260. At this point, the user may also select different security levels to assign to the barcode—security levels which will control who can access the document associated with this particular barcode. The security levels are matched against a user's ID predetermined security level, to see if that particular user may view the contents of the document. When the MFD scans the barcode, shown in more detail in FIG. 7, the user's ID (entered by the user at log in) is compared with the predetermined security level associated with that user's ID. The security level for each user can be stored in the MFD, for example in the hard disk drive (HDD) (element 360 in FIG. 13) or floppy disk drive (FDD) (element 365 in FIG. 13), just to name a few. An example of a security level scheme applicable to the present embodiment is a security level that includes three sections:

(1) a first section to identify the business entity to which the document pertains, for example a group of companies (A), an individual company (B), or an individual subsidiary (C), etc. . . . ;

(2) a second section to identify the department to which the document pertains, for example the human resources (1), accounting (2), marketing (3), or legal department (4), etc. . . . ; and (3) a third section to identify the individual (Laura, Jim, Caroline, Phil . . . ) who created the document/barcode.

For example, a user with the access level B-2-% would have access to all (%) accounting documents (2) related to company B. Alternatively, a user having the access level A-%-Jim would have access to only the documents created by Jim, in any department (%) of the group of companies (A). Under this exemplary scheme, a legal document created by Phil for the subsidiary C would have an access level of C-4-Phil.

The aforementioned PIN code is used to illustrate just one example, and one of ordinary skill may implement any other conventional identification or authentication means such as a Smart Card, a Proximity Card, or any type of biometrics such as, but not limited to, fingerprint recognition, face recognition, iris recognition, retinal recognition, hand recognition, voice recognition, or signature recognition. In the case of using cards or biometrics, the MFD may be configured to receive and process such type of data.

Returning to FIG. 6, at step 265, the PIN code (or any other identification or authentication means) is e-mailed, displayed, and/or printed. Once the desired security data has been set, the security data is encrypted, and the system generates a barcode 270 with all of the data embedded within. The barcode is then printed 275.

Figure 7:
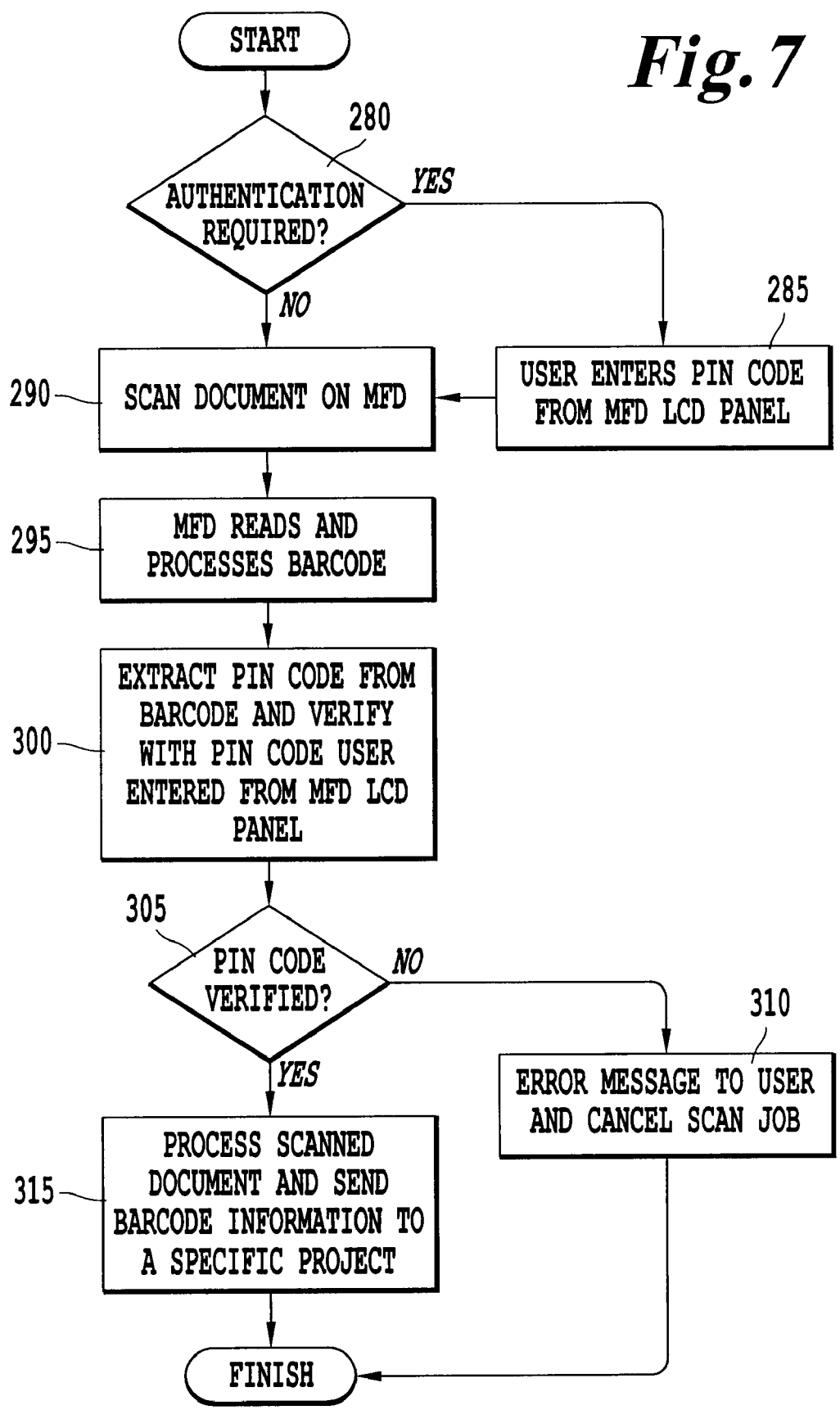
FIG. 7 is a block diagram detailing the barcode authentication process flow.

FIG. 7 is a block diagram detailing the barcode authentication process flow. The first step in the barcode authentication process is to determine whether any authentication is required 280. If there is no authentication required, the MFD scans the document at step 290. If there is an authentication requirement, the user is prompted on the MFD monitor or liquid-crystal-display (LCD) panel to enter the PIN code or any other authentication or identification data 285. Once the requested data is entered, the document is scanned on the MFD 290. The MFD next reads and processes the barcode at step 295, and at step 300 extracts the PIN code (or any other embedded identification or authentication data) and verifies whether the information matches with what the user had input at step 285. If the information (or PIN code) matches 305, then the document is scanned and the barcode information is sent to the specified project 315. If there is no match, then an error message is generated and the scanning procedure is canceled 310.

FIGS. 8-11 show various security implementations wherein the MFD communicates with more than one security system, such as the document mall server 320.

Figure 8:
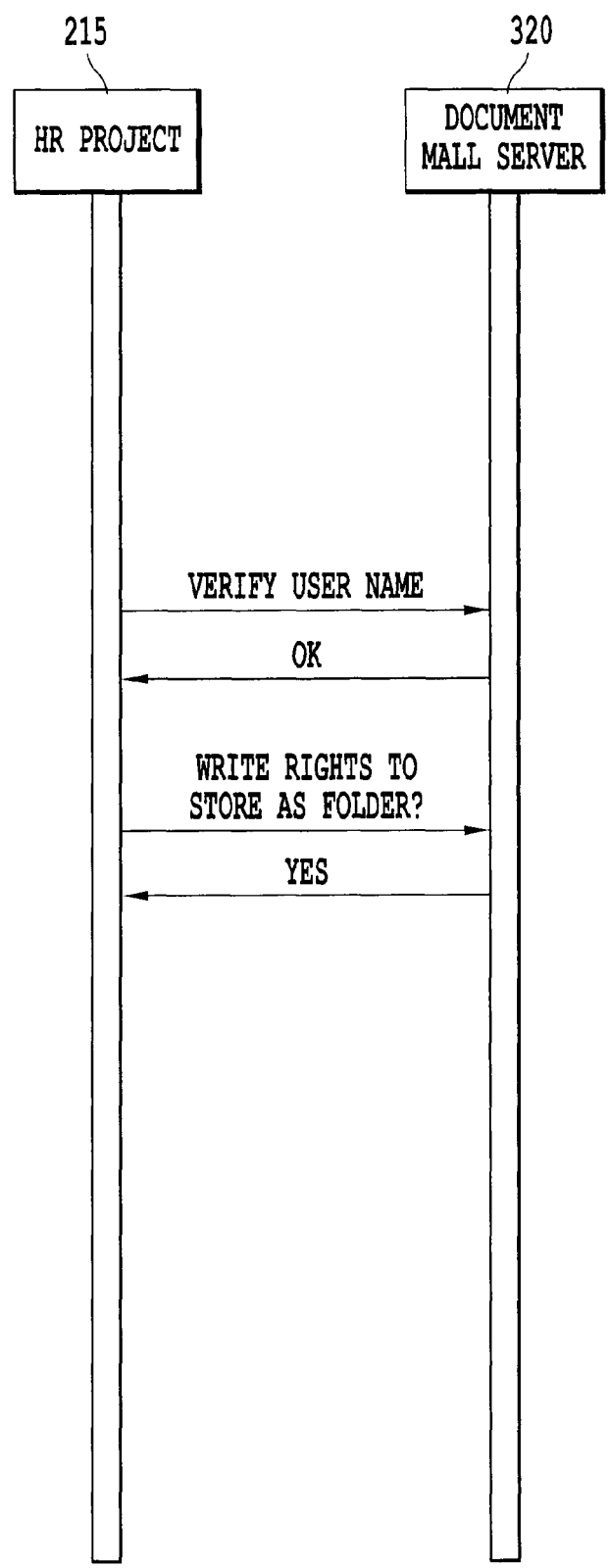
FIG. 8 shows the processing sequence for a security control.

FIG. 8 shows the processing sequence for scanning to another user's folder or scanning as another user 235 by selecting from a list "Who to Scan as" or "Whose folder to scan to" 236. For this example, a barcode.xml file, containing the following code may used:

```
<barcode>
<HR>
<service_list>
    <Security>
        <Delegation>
            <Logged_In_As>Assisstant A</Logged_In_As>
```

```
            <Store As>My Manager</Store As>
        </Delegation>
    </Security>
    <DMFolder>
        <Destination>/MyCabinet/resume/user1</Destination>
        <document_name>resume_user1.doc</document_name>
        <document_type>resume</document_type>
    </DMFolder>
</service_list>
</HR>
</barcode>
```

Once at the HR project 215, an engine parses the barcode_HR.xml file. The HR project contains two services: Security and DMFolder. In the HR project 215, an engine checks, with a document mall server 320, the Logged_In_As user name (in this case, from the .xml file above, the user name is Assistant A) and verifies if the user name has Delegation rights to Store As (in this case, from the .xml file above, the rights to Store As My Manager) user in a document mall server 320. If the user has rights, then the engine proceeds to store to DMFolder. Next, an engine stores to the DMFolder, /MyCabinet/resume/user1, sets document name to user1_resume.doc, and sets the document type as resume.

Figure 9:
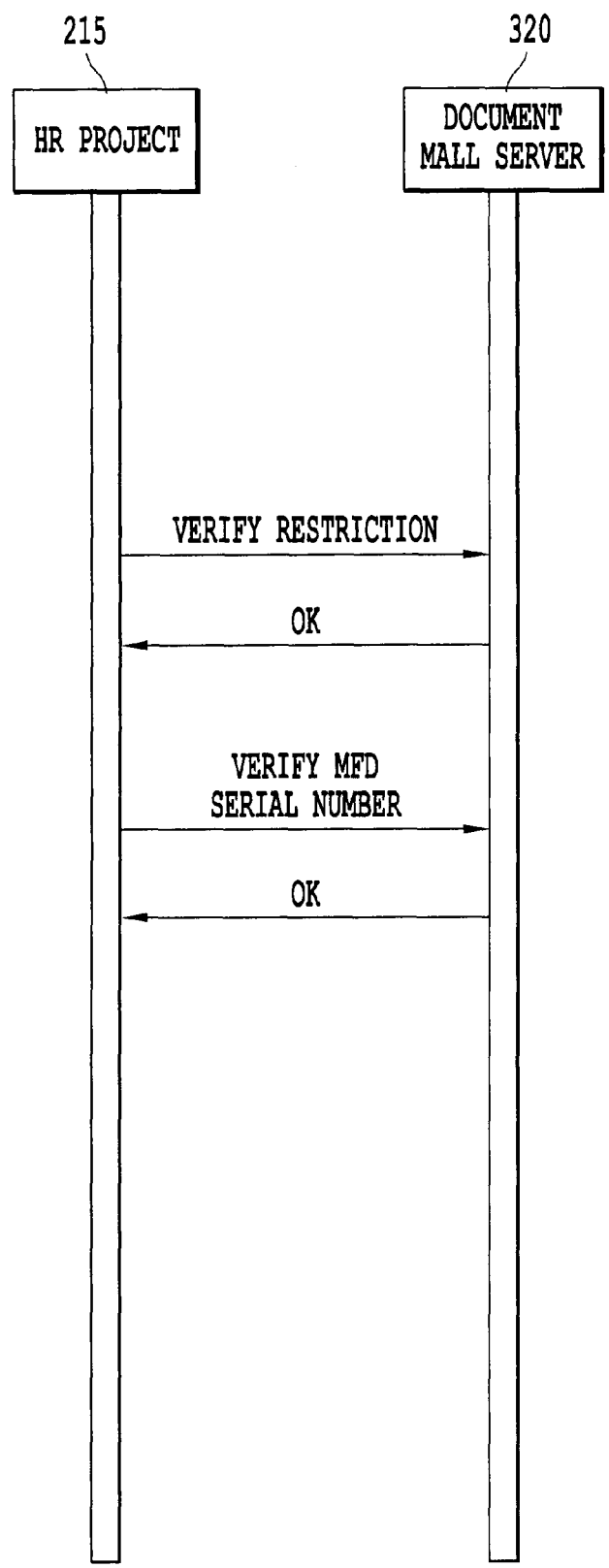
FIG. 9 shows the processing sequence for another security control.

FIG. 9 shows the processing sequence for adding security which restricts which MFD a user can scan from 240 by selecting an MFD serial number, or a number of MFD serial numbers, from a list of registered MFDs 241. For this example, a barcode.xml file, containing the following code may used:

```
<barcode>
<HR>
<service_list>
    <Security>
        <MFP_Restriction>Y</MFP_Restriction>
        <MFP_Serial_Number>ADE2039938</MFP_Serial_Number>
    </Security>
    <DMFolder>
        <Destination>/MyCabinet/resume/user1</Destination>
        <document_name>resume_user1.doc</document_name>
        <document_type>resume</document_type>
    </DMFolder>
</service_list>
</HR>
</barcode>
```

Once at the HR project 215, an engine parses the barcode_HR.xml file. The HR project contains two services: Security and DMFolder. In the HR project 215, an engine checks with the document mall server 320 to see if there is an MFD_Restriction on the MFD a user may scan from (in this case, from the .xml file above, the restriction is Y), verifies if the MFD_Serial_Number (in this case, from the .xml file above, the number is ADE2039938) is registered on the document mall server 320, and if so stores to DMFolder. Next, an engine stores to the DMFolder, /MyCabinet/resume/user1, sets document name to user1_resume.doc, and sets the document type as resume.

Figure 10:
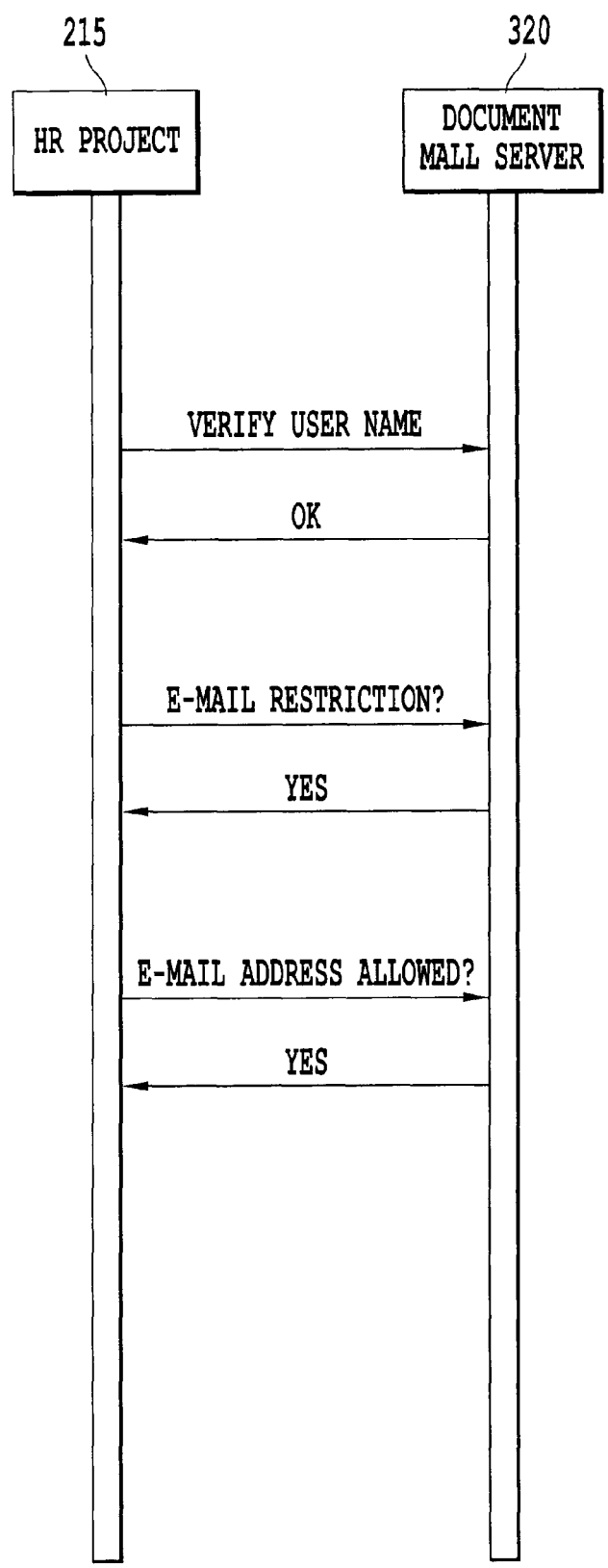
FIG. 10 shows the processing sequence for yet another security control.

FIG. 10 shows the processing sequence for adding security which restricts the destination of an e-mail or a folder 245 by selecting an e-mail address from a list of allowed destinations 246. For this example, a barcode.xml file, containing the following code may used:

```
<barcode>
<HR>
<service_list>
    <Security>
        <Logged_In_As>user1</Logged_In_As>
        <e-mail_restriction>Y</e-mail_restriction>
        </e-mail>
    </Security>
    <Scan_to_Email>
        <e-mail>user1@ricoh-usa.com</e-mail>
        <document_name>invoice1.doc</document_name>
    </Scan_to_Email>
</service_list>
</HR>
</barcode>
```

Once at the HR project 215, an engine parses the barcode_HR.xml file. The HR project contains two services: Security and Scan_to_Email. In the HR project 215, and engine checks with the document mall server 320, the Logged_In_As user name (in this case, from the .xml file above, the user name is user1) and verifies if the user name has an e-mail_restriction (in this case, from the .xml file above, the restriction is Y). If there is such restriction, the engine verifies the destination e-mail addresses with the document mall server 320, and then an engine sends email according to the specified instructions found within the .xml file, i.e. to user1@ricoh-usa.com, and sets the document name to invoice1.doc.

Figure 11:
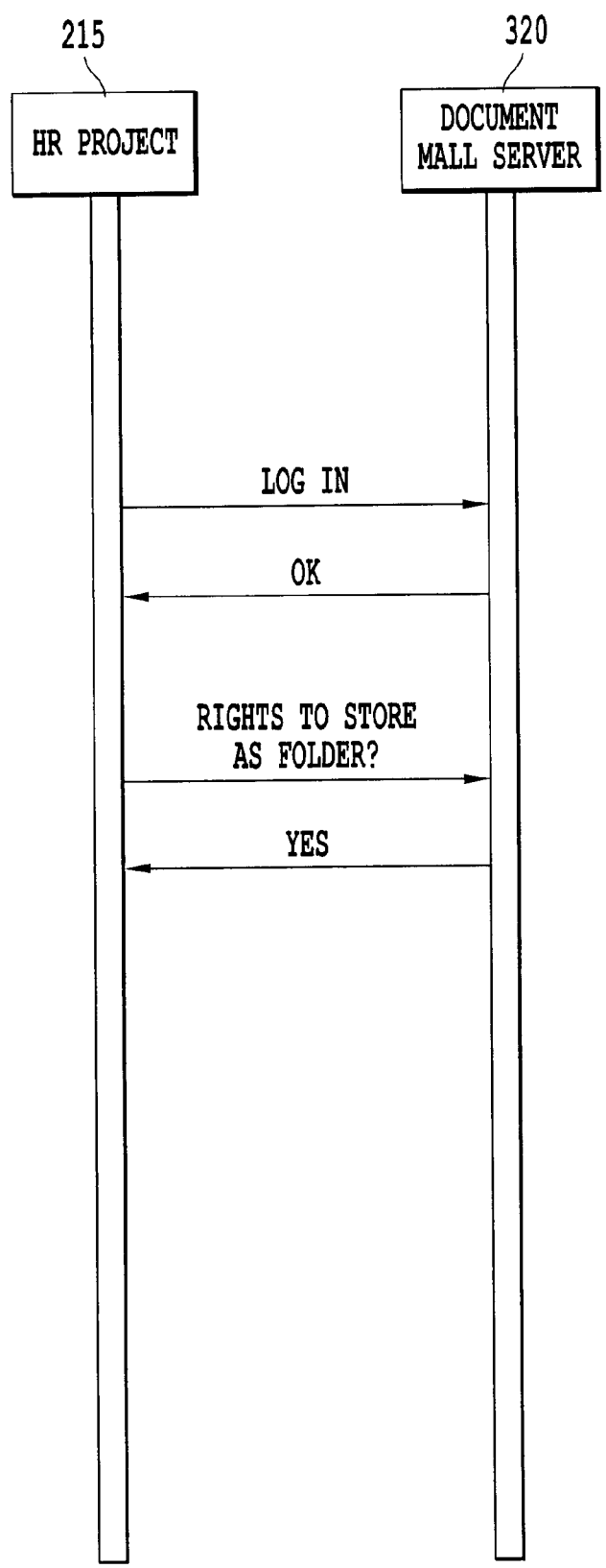
FIG. 11 shows the processing sequence for another security control.

FIG. 11 shows the processing sequence for adding security by embedding user credentials such as, but not limited to, user name, password, or account name 250, and selecting a destination, such as an e-mail address or a destination folder, from a list of allowed destinations 251. For this example, a barcode.xml file, containing the following code may used:

```
<barcode>
<HR>
<service_list>
    <Delegation>
        <UserName>Assisstant A</UserName>
        <Store As>My boss X</Store As>
    </Delegation>
    <DMFolder>
        <Destination>/MyCabinet/resume/user1</Destination>
        <document_name>resume_user1.doc</document_name>
        <document_type>resume</document_type>
    </DMFolder>
</service_list>
</HR>
</barcode>
```

Once at the HR project 215, an engine parses the barcode_HR.xml file. The HR project contains two services: Delegation and DMFolder. In the HR project 215, an engine logs into the document mall server 320 by using a user name (in this case, from the .xml file above, the user name is Assistant A), verifies if the user name has Delegation rights to Store As (in this case, from the .xml file above, the rights to Store As My boss X) user in the document mall server 320. If the user name has rights, then the engine stores to the DMFolder, /MyCabinet/resume/user1, sets document name to user1_resume.doc, and sets the document type as resume.

Figure 12:
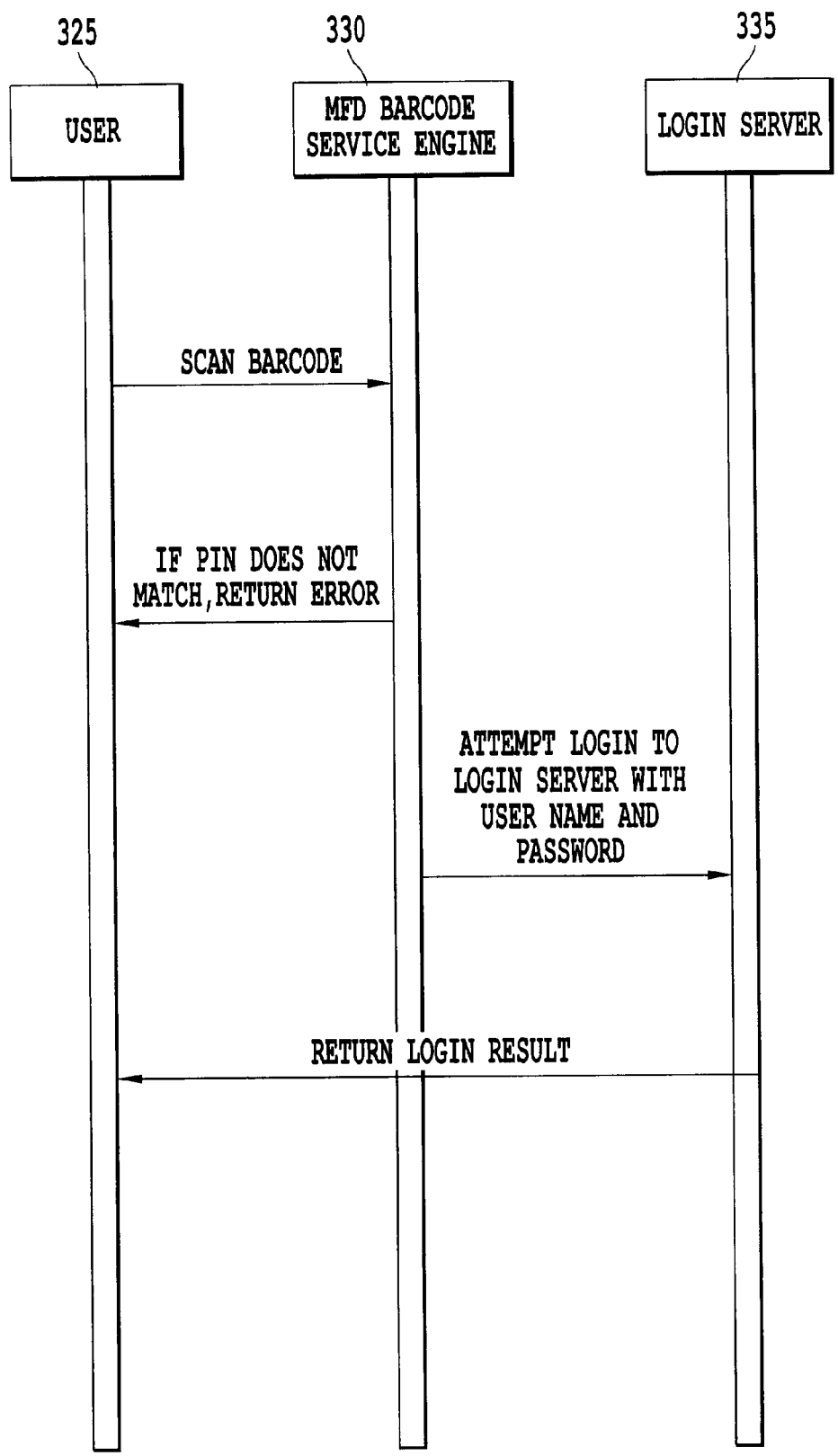
FIG. 12 shows an example of a barcode authentication processing sequence according to an embodiment.

FIG. 12 shows an example of a barcode authentication processing sequence according to an embodiment. In this example, a user 325 enters a PIN code, or any other conventional identification or authentication means such as a Smart Card, a Proximity Card, or any type of biometrics, on an MFD, and then proceeds to scan the already-embedded barcode physically printed on a document or file, or digitally printed on a digital document or file. The barcode service engine 330, located within the MFD, reads the scanned barcode and extracts the barcode.xml file. The engine then compares the PIN code, or any other information entered by the user 325, with the embedded PIN code, or any other embedded identification or authentication information. If there is no match, an error is generated and returned to the user 325. If there is a match, then the engine extracts user name and password, and attempts to log in to login server 335 using the user name and password. The log in results are then sent from the login server 335 to the user 325.

Once the user 325 is verified and logged in, the barcode service engine 330 reads and processes the data embedded within the barcode according to FIG. 5. To reiterate, the engine separates the embedded barcode data according to project name. For example, the MFD engine may separate barcode_HR.xml and barcode_Accounting.xml, and then pass or route the .xml files to each corresponding project.

Figure 12A:
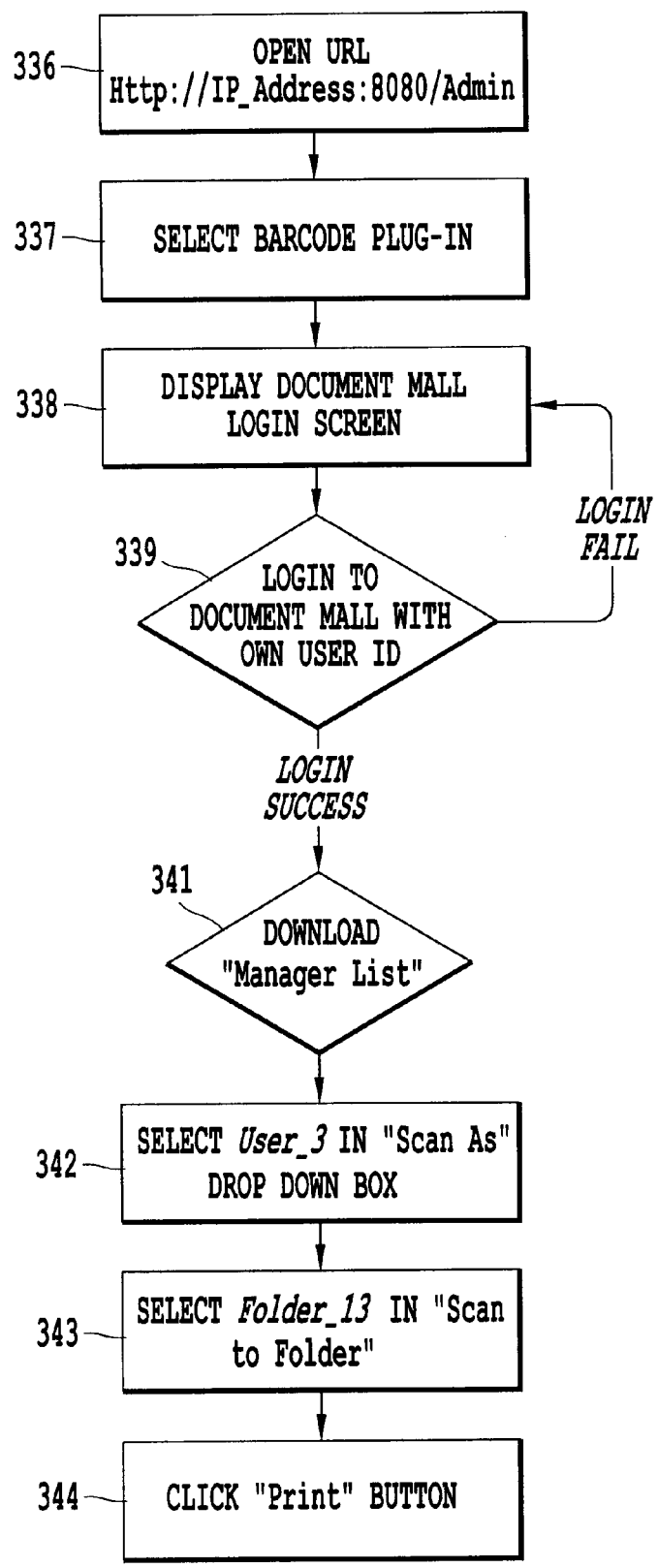
FIG. 12A is a block diagram showing another example of generating a barcode.

FIG. 12A is a block diagram showing an example of generating a barcode without having to download an application on user's PC 105. In this embodiment, a user logs in from his or her PC into the document mall server 320, which, as mentioned above, can be any network system, any document management system, or any project. The document mall server 320 is configured to allow a user to go through the process of generating a barcode. In this embodiment, a user may select any type of operation or data to be embedded in the barcode. At step 336, a user opens an Uniform Resource Locator "URL" such as Http://IP_Address:8080/Admin from any conventional web browser. The user next selects barcode plug-in, at step 337, from a menu appearing at the specified URL address. At step 338, the document mall login screen is displayed for the user. The user then, at step 339, attempts to log in to document mall by using his or her user identification. If the login failed, the user is brought back to step 338, and asked to re-enter the user identification credentials. If the login was successful, a "Manager List" is displayed, at step 341, for the user to select which manager he or she is scanning for. Next, at step 342, the user may select User_3, for example, from the "Scan As" menu. At 343, the user may select Folder_13 from the "Scan to Folder" menu. After the user has selected the desired data to embed, the user may click the "Print" button, at step 344, to print the embedded barcode.

Figure 13:
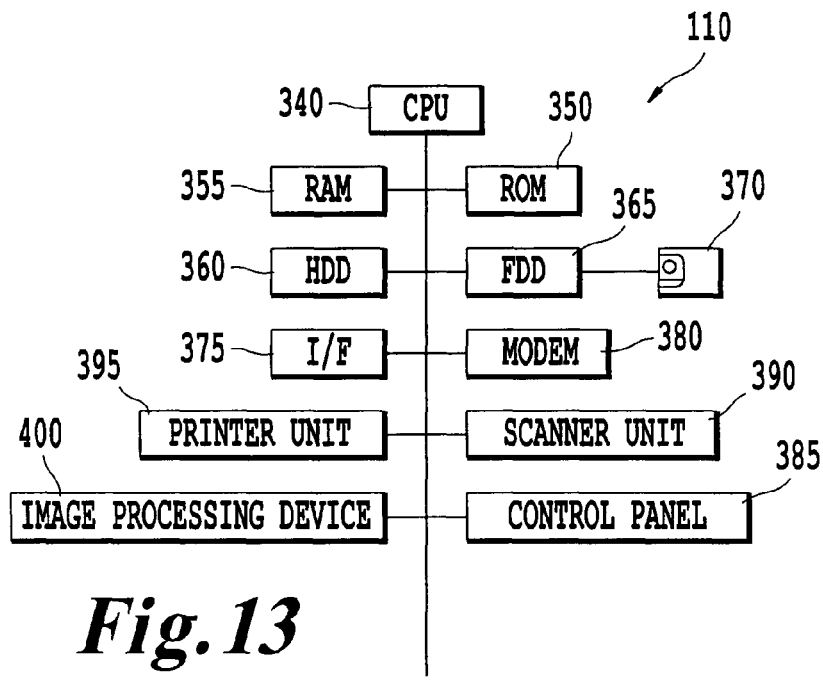
FIG. 13 is a schematic representation of an image processing device according to one embodiment.
Figure 14:
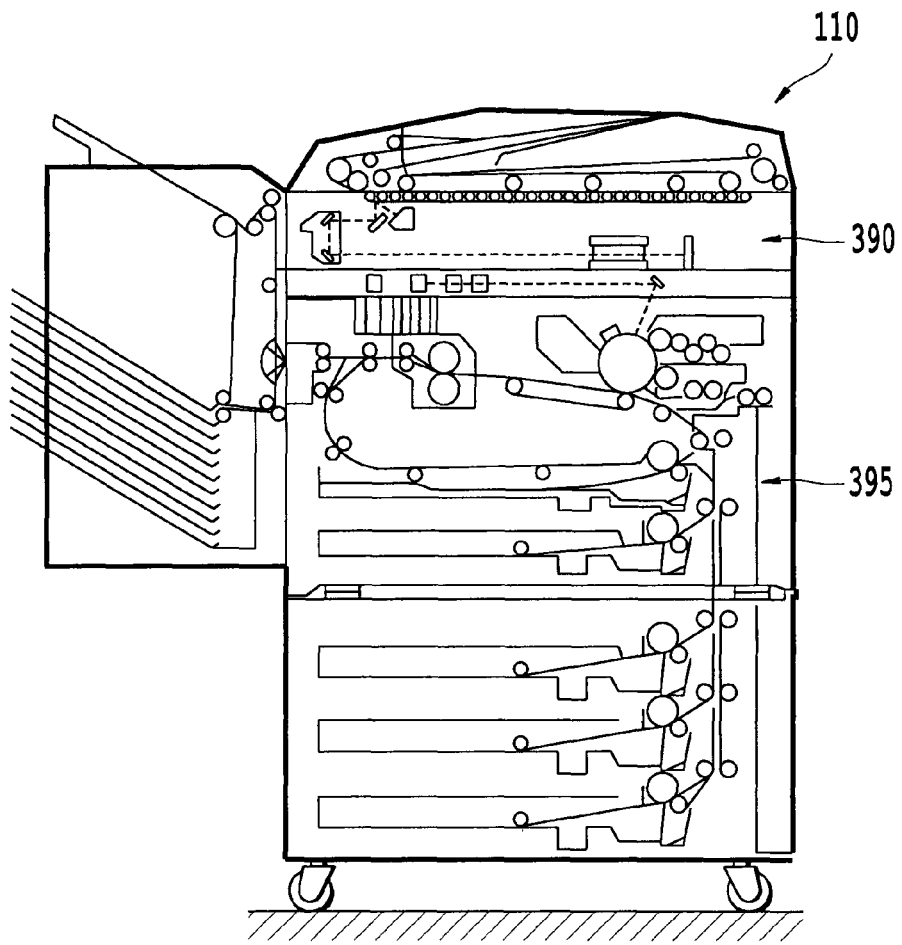
FIG. 14 is a block diagram illustrating of an image processing device according to one embodiment.

FIGS. 13 and 14 illustrate an example of the MFD 110, which includes a central processing unit (CPU) 340, and various elements connected to the CPU 340 by an internal bus 345. The CPU 340 services multiple tasks while monitoring the state of the MFD 110. The elements connected to the CPU 340 include a read only memory (ROM) 350, a random access memory (RAM) 355, a hard disk drive (HDD) 360, a floppy disk drive (FDD) 365 capable of receiving a floppy disk 370, a communication interface (I/F) 375, and a modem unit 380. In addition, a control panel 385, a scanner unit 390, a printer unit 395, and an image processing device 400 can be connected to the CPU 340 by the bus 345. Both the I/F 375 and the modem unit 380 are connected to a communication network 115.

The program code instructions for the MFD 110 may be stored on the HDD 360 via an IC card. Alternatively, the program code instructions can be stored on the floppy 370 so that the program code instructions may be read by the FDD 365, transferred to the RAM 355 and executed by the CPU 340 to carry out the instructions. These instructions can be the instructions to perform the MFD's functions described above. These instructions permit the MFD 110 to control the control panel 385 and the image processing units of the MFD 110.

During a start-up of the MFD 110, the program code instructions may be read by the CPU 340, transferred to the RAM 355 and executed by the CPU 340. Alternatively, the program code instructions may be loaded to the ROM 350. It is therefore understood that in the present invention any of the floppy disk 370, the HDD 360, the RAM 355, and the ROM 350 correspond to a computer readable storage medium capable of storing program code instructions. Other devices and medium that can store the instructions according to the present invention include for example magnetic disks, optical disks including DVDs, magneto-optical disks such as MOS, and semiconductor memory cards such as PC cards, compact flash cards, smart media, memory sticks, etc.

In a preferred embodiment, the control panel 385 includes a user interface that displays information allowing the user to interact with the MFD 110. The display screen can be a LCD, a plasma display device, or a cathode ray tube CRT display. The display screen does not have to be integral with, or embedded in, the control panel 385, but may simply be coupled to the control panel 385 by either a wire or a wireless connection. The control panel 385 may include keys for inputting information or requesting various operations. Alternatively, the control panel 385 and the display screen may be operated by a keyboard, a mouse, a remote control, touching the display screen, voice recognition, or eye-movement tracking, or a combination thereof.

In an embodiment, the MFD may read the XML data embedded within a barcode and if the data contains such instructions, may communicate with a project, without involving the document itself. For example, instructions may simply say to send out the data to a destination, such as a project. If, however, the data embedded within the barcode contains document processing information, the actual document may be processed based on that information. Such processing information may be whether a particular piece of data found on page 2 of the document needs to be validated. If, for example, the XML data contains instructions that a document needs highlighting on page 7, the MFD may then send the processing information, along with the document, to the specified project for performing the highlighting.

Figure 15:
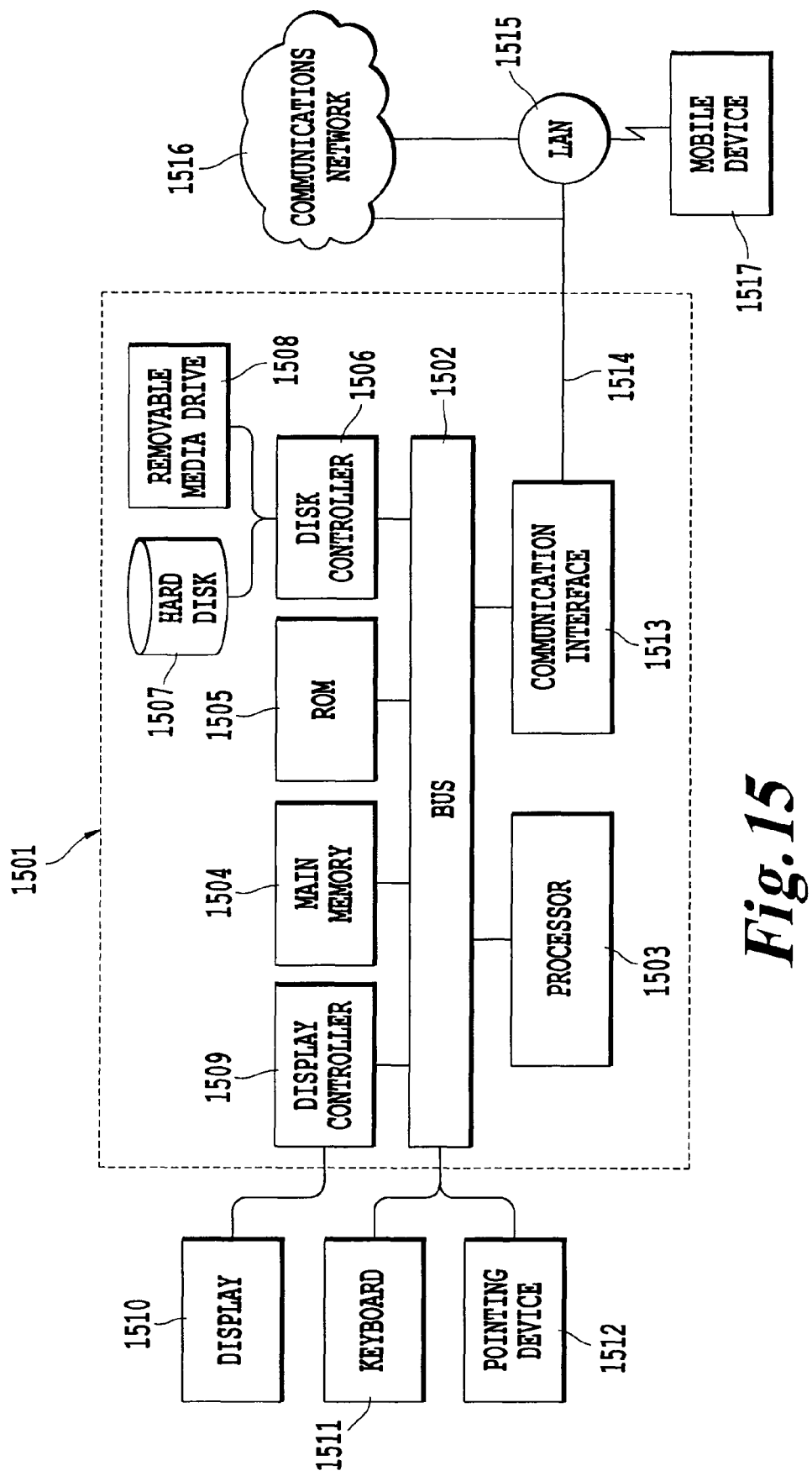
FIG. 15 is an exemplary block diagram of a computer system according to one embodiment.

FIG. 15 illustrates a computer system 1501 upon which at least one of the PC 105 and the MFD 110 of the present invention may be implemented. The computer system 1501 includes a bus 1502 or other communication mechanism for communicating information, and a processor 1503 coupled with the bus 1502 for processing the information. The computer system 1501 also includes a main memory 1504, such as a random access memory (RAM) or other dynamic storage device (e.g., dynamic RAM (DRAM), static RAM (SRAM), and synchronous DRAM (SDRAM)), coupled to the bus 1502 for storing information and instructions to be executed by processor 1503. In addition, the main memory 1504 may be used for storing temporary variables or other intermediate information during the execution of instructions by the processor 1503. The computer system 1501 further includes a read only memory (ROM) 1505 or other static storage device (e.g., programmable ROM (PROM), erasable PROM (EPROM), and electrically erasable PROM (EEPROM)) coupled to the bus 1502 for storing static information and instructions for the processor 1503.

The computer system 1501 also includes a disk controller 1506 coupled to the bus 1502 to control one or more storage devices for storing information and instructions, such as a magnetic hard disk 1507, and a removable media drive 1508 (e.g., floppy disk drive, read-only compact disc drive, read/write compact disc drive, compact disc jukebox, tape drive, and removable magneto-optical drive). The storage devices may be added to the computer system 1501 using an appropriate device interface (e.g., small computer system interface (SCSI), integrated device electronics (IDE), enhanced-IDE (E-IDE), direct memory access (DMA), or ultra-DMA).

The computer system 1501 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 1501 may also include a display controller 1509 coupled to the bus 1502 to control a display 1510, such as a cathode ray tube (CRT), for displaying information to a computer user. The computer system includes input devices, such as a keyboard 1511 and a pointing device 1512, for interacting with a computer user and providing information to the processor 1503. The pointing device 1512, for example, may be a mouse, a trackball, or a pointing stick for communicating direction information and command selections to the processor 1503 and for controlling cursor movement on the display 1510. In addition, a printer may provide printed listings of data stored and/or generated by the computer system 1501.

The computer system 1501 performs a portion or all of the processing steps of the invention in response to the processor 1503 executing one or more sequences of one or more instructions contained in a memory, such as the main memory 1504. Such instructions may be read into the main memory 1504 from another computer readable medium, such as a hard disk 1507 or a removable media drive 1508. One or more processors in a multi-processing arrangement may also be employed to execute the sequences of instructions contained in main memory 1504. In alternative embodiments, hard-wired circuitry may be used in place of or in combination with software instructions. Thus, embodiments are not limited to any specific combination of hardware circuitry and software.

As stated above, the computer system 1501 includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the present invention includes software for controlling the computer system 1501, for driving a device or devices for implementing the invention, and for enabling the computer system 1501 to interact with a human user (e.g., print production personnel). Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The term "computer readable medium" as used herein refers to any medium that participates in providing instructions to the processor 1503 for execution. A computer readable medium may take many forms, including but not limited to, non-volatile media, volatile media, and transmission media. Non-volatile media includes, for example, optical, magnetic disks, and magneto-optical disks, such as the hard disk 1507 or the removable media drive 1508. Volatile media includes dynamic memory, such as the main memory 1504. Transmission media includes coaxial cables, copper wire and fiber optics, including the wires that make up the bus 1502. Transmission media also may also take the form of acoustic or light waves, such as those generated during radio wave and infrared data communications.

Various forms of computer readable media may be involved in carrying out one or more sequences of one or more instructions to processor 1503 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to the computer system 1501 may receive the data on the telephone line and use an infrared transmitter to convert the data to an infrared signal. An infrared detector coupled to the bus 1502 can receive the data carried in the infrared signal and place the data on the bus 1502. The bus 1502 carries the data to the main memory 1504, from which the processor 1503 retrieves and executes the instructions. The instructions received by the main memory 1504 may optionally be stored on storage device 1507 or 1508 either before or after execution by processor 1503.

The computer system 1501 also includes a communication interface 1513 coupled to the bus 1502. The communication interface 1513 provides a two-way data communication coupling to a network link 1514 that is connected to, for example, a local area network (LAN) 1515, or to another communications network 1516 such as the Internet. For example, the communication interface 1513 may be a network interface card to attach to any packet switched LAN. As another example, the communication interface 1513 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1513 sends and receives electrical, electromagnetic or optical signals that carry digital data streams representing various types of information.

The network link 1514 typically provides data communication through one or more networks to other data devices. For example, the network link 1514 may provide a connection to another computer through a local network 1515 (e.g., a LAN) or through equipment operated by a service provider, which provides communication services through a communications network 1516. The local network 1514 and the communications network 1516 use, for example, electrical, electromagnetic, or optical signals that carry digital data streams, and the associated physical layer (e.g., CAT 5 cable, coaxial cable, optical fiber, etc). The signals through the various networks and the signals on the network link 1514 and through the communication interface 1513, which carry the digital data to and from the computer system 1501 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1501 can transmit and receive data, including program code, through the network(s) 1515 and 1516, the network link 1514 and the communication interface 1513. Moreover, the network link 1514 may provide a connection through a LAN 1515 to a mobile device 1517 such as a personal digital assistant (PDA) laptop computer, or cellular telephone.

Obviously, numerous additional modifications and variations of the present invention are possible in light of the above teachings. It is therefore to be understood that within the scope of the appended claims the present invention may be practiced otherwise than as specifically described herein.

The invention claimed is:

1. An information processing apparatus, comprising:
   an interface configured to receive an input selecting one of a plurality of image processing services and an instruction associated with the one of a plurality of image processing services;
   a processor configured to generate machine-readable instructions based on the selected one of a plurality of image processing services and instruction associated with the one of a plurality of image processing services;
   a processor configured to generate a barcode corresponding to the machine-readable instructions; and
   an output configured to embed the barcode on a document output from the information processing apparatus, the barcode including security data associated with the document.

2. The information processing apparatus of claim 1, wherein:
   the output is configured to print the barcode on a document generated at the information processing apparatus.

3. The information processing apparatus of claim 1, further comprising:
   a display configured to display the plurality of image processing services and instructions associated with each of the image processing services.

4. The information processing apparatus of claim 1, wherein:
   the machine-readable instructions instruct a computer remote from the information processing apparatus to perform image processing services.

5. The information processing apparatus of claim 1, further comprising:
   a network interface configured to receive a menu from a computer remote from the information processing apparatus that includes a plurality of image processing services; and
   a display configured to display the menu.

6. The information processing apparatus of claim 5, wherein:
   the interface is configured to receive the input selecting one of a plurality of image processing services and an instruction associated with the one of a plurality of image processing services based on the displayed menu; and
   the network interface is configured to transmit data corresponding to the selected one of a plurality of image processing services and an instruction associated with the one of a plurality of image processing services to the computer remote from the information processing apparatus.

7. The information processing apparatus of claim 1, wherein:
the instruction associated with the one of a plurality of image processing services includes one of an optical character recognition, storage, emailing, facsimile, and authentication service.

8. The information processing apparatus of claim 1, wherein:
the generated machine-readable instructions are in the form of one of Extensible Markup Language (XML) and Hypertext Markup Language (HTML).

9. An image processing apparatus, comprising:
a scanner configured to scan a document, the document including a barcode representing machine-readable instructions and including security data associated with the document;
a processor configured to extract the machine-readable instructions and the security data from the barcode on the scanned document and to determine whether data in the security data matches user input data; and
a processor configured to initiate a process based on the extracted machine-readable instructions in response to the data in the security data matching the user input data.

10. The image processing apparatus of claim 9, further comprising:
a network interface configured to transmit instructions to a computer remote from the image processing apparatus based on the extracted machine-readable instructions.

11. The image processing apparatus of claim 9, further comprising:
a network interface configured to transmit the scanned document along with the extracted machine-readable instructions to a computer remote from the image processing apparatus.

12. The image processing apparatus of claim 9, further comprising:
a processor configured to perform image processing operations at the image processing apparatus based on the extracted machine-readable instructions.

13. The image processing apparatus of claim 9, further comprising:
a network interface configured to connect the image processing apparatus to a plurality of remote computers configured to perform image processing operations; and
a processor configured to select one of the plurality of remote computers to which to transmit the document based on the extracted machine-readable instructions.

14. The image processing apparatus of claim 9, wherein:
the machine-readable instructions include instructions to perform one of an optical character recognition, storage, emailing, facsimile and authentication service on the document.

15. The image processing apparatus of claim 9, wherein:
the extracted machine-readable instructions are in the form of one of Extensible Markup Language (XML) and Hypertext Markup Language (HTML).

16. The image processing apparatus of claim 9, further comprising:
a network interface configured to receive the document including the barcode from a computer remote from the image processing apparatus via a network.

17. A document management system comprising:
an interface, at an information processing apparatus, configured to receive an input selecting one of a plurality of image processing services;
a processor, at the information processing apparatus, configured to generate machine-readable instructions based on the selected one of a plurality of image processing services and generate a barcode corresponding to the machine-readable instructions;
an output, at the information processing apparatus, configured to embed the barcode on a document output from the information processing apparatus, the barcode including security data associated with the document;
a scanner, at an image processing apparatus, configured to scan the document including the barcode;
a processor, at the image processing apparatus, configured to extract the machine-readable instructions and the security data from the barcode and to determine whether data in the security data matches user input data; and
a processor, at the image processing apparatus, configured to initiate a process based on the extracted machine-readable instructions in response to the data in the security data matching the user input data.

* * * * *